(No Model.) 2 Sheets—Sheet 1.
E. CARDARELLI.
LOADING OR UNLOADING APPARATUS.
No. 505,749. Patented Sept. 26, 1893.
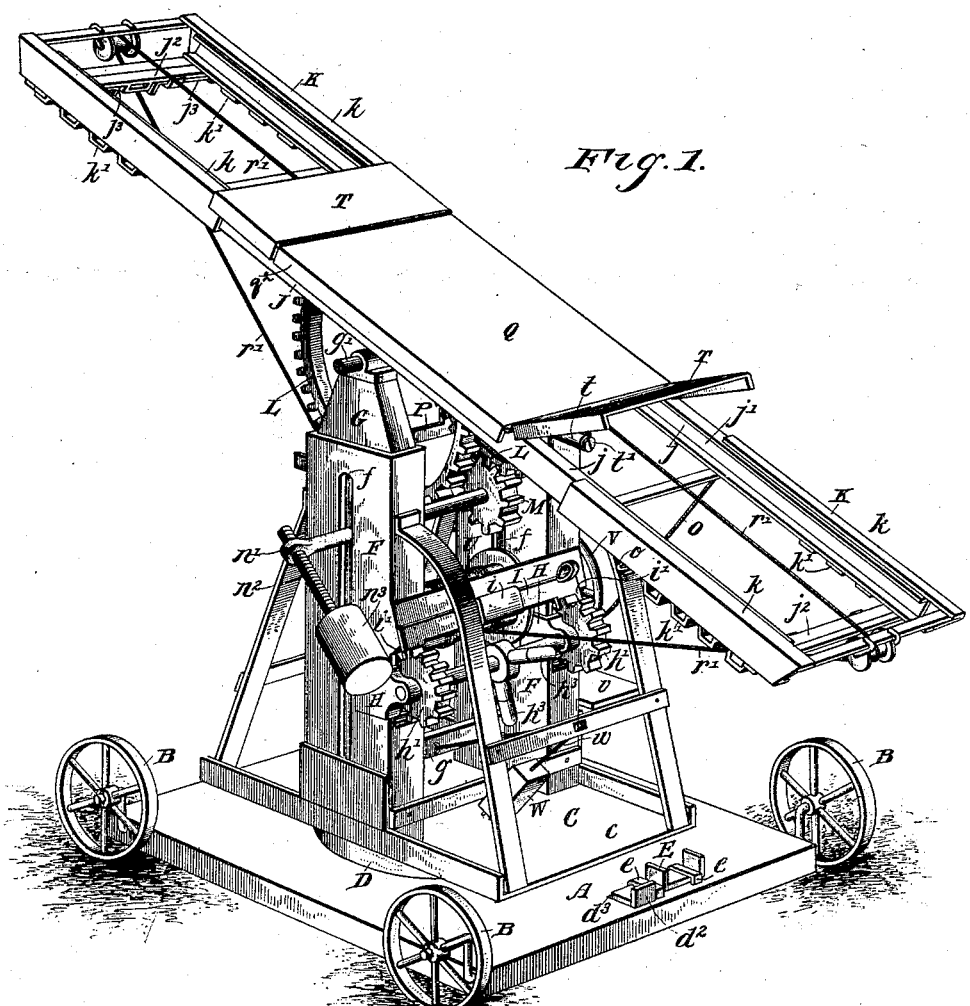
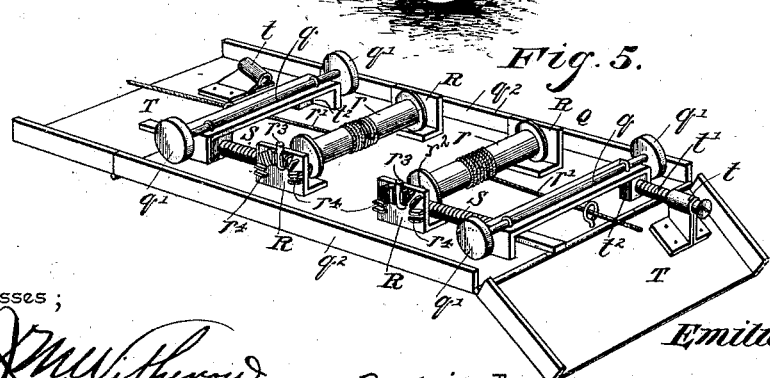
Witnesses:
Inventor,
Emilio Cardarelli,
By his Attorneys,

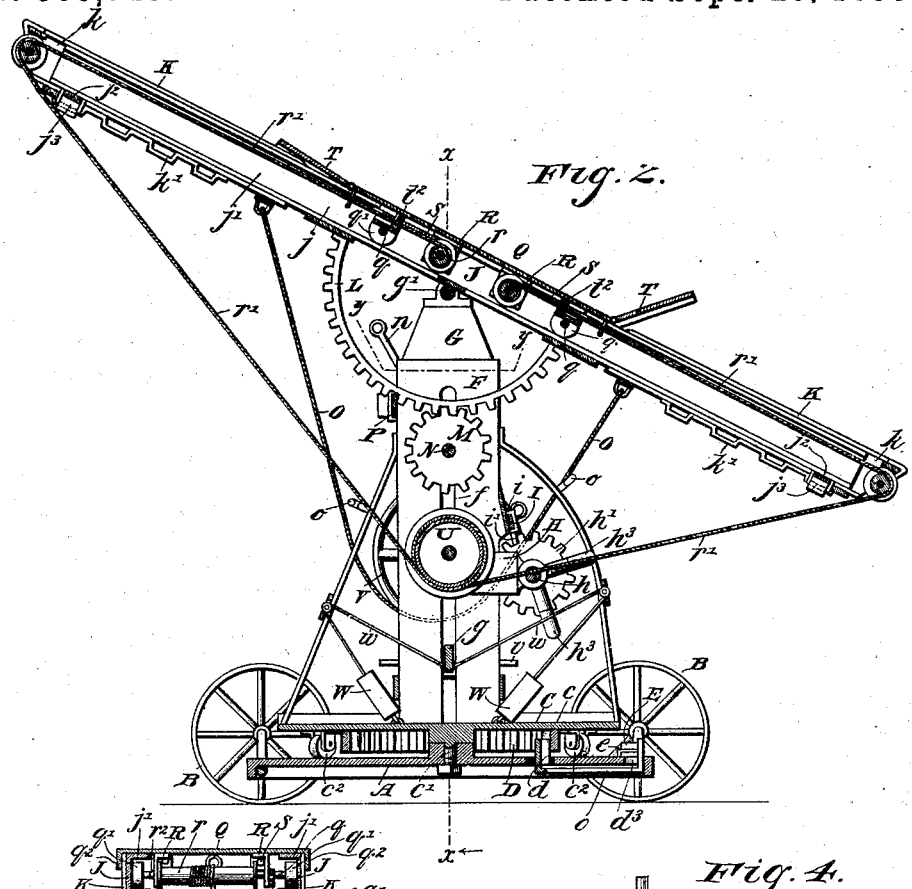

UNITED STATES PATENT OFFICE.

EMILIO CARDARELLI, OF SUMTER, SOUTH CAROLINA, ASSIGNOR OF ONE-HALF TO GEORGE W. DICK, OF SAME PLACE.

LOADING OR UNLOADING APPARATUS.

SPECIFICATION forming part of Letters Patent No. 505,749, dated September 26, 1893.

Application filed November 30, 1892. Serial No. 453,674. (No model.)

*To all whom it may concern:*

Be it known that I, EMILIO CARDARELLI, a citizen of the United States, residing at Sumter, in the county of Sumter and State of South Carolina, have invented a new and useful Loading or Unloading Apparatus, of which the following is a specification.

This invention relates to loading or unloading apparatus; and it has for its object to provide a machine of this character, which by means of its portability and several adjustments, is especially available for use in transferring goods from point to point, particularly in loading and unloading railway cars and vessels.

To this end the invention primarily contemplates certain improvements in portable loading or unloading apparatus, whereby the same shall be better adapted for the work and be under the ready control of the operator.

With these and many other objects in view which will readily appear as the nature of the invention is better understood, the same consists in the novel construction, combination and arrangement of parts, hereinafter more fully described, illustrated and claimed.

In the accompanying drawings:—Figure 1 is a perspective view of a conveyer for loading and unloading apparatus set up in position for use. Fig. 2 is a central vertical longitudinal sectional view of the same. Fig. 3 is a vertical transverse sectional view on the line $x-x$ of Fig. 2. Fig. 4 is a horizontal sectional view on the line $y-y$ of Fig. 2. Fig. 5 is a detail bottom perspective view of the car.

Referring to the accompanying drawings, A represents a platform truck mounted on the wheels B, which provide means for carrying the truck from point to point. Mounted upon the platform truck A, is the revoluble standard frame C, having the lower base plate $c$, provided with a central pivot bolt $c'$, passing through and bolted to the platform of the truck so as to pivotally support the standard frame thereon. The base plate $c$, of the revoluble standard frame carries the anti-friction supporting rollers $c^2$, which travel upon the flat truck platform and hold the standard frame steady when turned thereon. Secured to the under side of the base plate $c$, is the cog ring D, inside of which is arranged the sliding cog lock plate $d$. The cog lock plate $d$, is secured to the inner end of the sliding bar $d'$, arranged to slide under the truck platform and provided on its outer end with an upturned tongue $d^2$, projecting up through a slot $d^3$, in the platform, and adapted to be held stationary by the sliding lock bolt E, mounted to slide in suitable keepers $e$, on top of the truck platform and be slid behind the tongue $d^2$, when the lock plate has been drawn into engagement with the teeth of the cog ring. This construction provides means for holding the revoluble standard frame locked in any turned position.

Arising from opposite sides of the base plate of the revoluble standard frame are the opposite tubular guide standards F, having the central longitudinal slots $f$, extending from their lower to their upper ends so as to accommodate the sliding movement or the vertical adjustment of certain shafts to be hereinafter described. The opposite slotted tubular guide standards accommodate the opposite vertically adjustable rack bars G, one face of which is toothed, and the upper and lower ends of which are connected by the end cross bars $g$, $g'$ which complete a rack bar frame, so that the adjustment of both rack bars is simultaneous, the upper cross bar forming a pivot rod for the track to be described. Mounted in suitable bearings H, at one side of the tubular guide standards is the rack bar frame operating shaft $h$, which shaft carries near opposite ends thereof the pinions or cog wheels $h'$, projecting through slots in the sides of the tubular guide standards and meshing with the opposite rack bars, so that the entire rack bar frame can be raised and lowered to any position desired. The shaft $h$, carries suitable hand spokes $h^3$, to provide for the turning of the shaft, and in order to lock the shaft stationary after the rack bar frame has been adjusted, I employ a sliding lock bar I. The lock bar I, is mounted to slide in a suitable guide $i$, secured at one side of the standard frame, and is provided with the opposite locking tongue $i'$, which may be simultaneously slid in and out of engagement with the teeth of the pinions or cog wheels $h'$.

Pivotally mounted at its center on the upper cross bar or rod $g'$, of the vertically adjustable rack bar frame is the pivoted track section J. The pivoted track section J, comprises the opposite connected rail $j$, having the inner face grooves or channels $j'$, said rails of the pivoted track section being provided at their opposite ends with bridles $j^2$, on each of which are mounted the oppositely working sliding locking bolts $j^3$, the function of which will be presently apparent. Arranged to slide over each end of the pivoted track section J, are the opposite end sliding extension sections K, which provide means for lengthening and shortening the track as occasion may require, and each of the end extension sections K, comprises the opposite rails $k$, which are duplicate constructions of the rails of the pivoted sections. Each of the rails of the end extension sections is provided with a series of sockets or keepers $k'$, which are adapted to receive the locking bolts $j^3$, thus providing means for locking the extension sections K, to the main pivoted track section at any extended position.

Secured centrally to the under side of the pivoted track section J, are the parallel toothed segments L, the teeth of which mesh with the track operating pinions or cog wheels M. The pinions or cog wheels M, are secured on the transverse counterbalanced operating shaft N, which shaft is journaled at each end in the opposite vertically adjustable rack bars of the rack bar frame, and the ends of said shaft also work in the central slots of the guide standards, so that the shafts can be carried up and down with the rack frame. At one end of the shaft N, is secured a suitable operating crank handle $n$, while the opposite end of the shaft is provided with a threaded nut or block $n'$, which adjustably receives the threaded stem $n^2$, to one end of which is secured the over and counterbalancing weight $n^3$. Now it will be readily seen that by means of the counterbalanced shaft and the segments of the pivoted track, the said track and its extensions can be tilted to either side of the standard frame or to any position or angle desired, the adjustable weight at one end of said shaft providing means to assist in tilting the track in any direction. It will be seen that the pendulum weight at one end of the shaft N, while it assists to raise the lowest end of the tilted track to a higher level, at the same time after the weight has passed beyond its perpendicular position, it necessarily eases the fall of the other end of the track which is being lowered, inasmuch as the weight tends to fall in an opposite direction to the fall of the end of the track. The weight can be adjusted as desired. After the track has been tilted to any set position, the same may be held firm in such potion when the rack bar frame is elevated, by means of the retaining rope or wire O. The ends of the rope or wire are secured to the pivoted track at each side of its pivotal support, it being illustrated that the ends of the rope or wire are connected to the inner ends of the extension sections. The opposite portions of the rope or wire O, are adapted to be looped or wound on the stay hooks $o$, secured to opposite sides of the standard frame, to provide means for the attachment of the retaining rope or wire thereto, to hold the track stationary in its tilted position. In case it is not necessary to elevate the rack bar frame, in order to lock the pivoted track in its tilted position, I employ the sliding lock bar P, arranged on one side of the standard frame and provided with the locking tongues $p$, adapted to be slid in and out of engagement with the teeth of the toothed segments as shown in Fig. 2, but said locking bar may be attached directly to the rack bar frame if desired. At this point it may be further observed with respect to the retaining rope or wire, that it is only necessary to attach one portion thereof to one of the stay hooks $o$, when the machine is being used to load from a low point to a high point, in order that the lowest end of the track may be prevented from rising too far when the weighted car is traveling over the higher portion of the track and would tend to lower such high portion. The rope or wire can be used in various ways to hold or bring the or lowering the same or for adjusting it so track into any position, for quickly raising that the track is allowed a limited play, which depends entirely upon the use to which the apparatus is put.

Mounted to run over the track from end to end thereof is the flat car Q, on the under side of which are mounted the axles $q$, carrying at each end thereof the guide wheels or rollers $q'$, which work in the inner face grooves or channels of the rails, so that the platform car is held and guided to its work over the track, and is prevented from becoming displaced, and the same is further provided with the side retaining flanges $q^2$, which overlap the sides of the rails and hold the car in position. Journaled in bearing lugs R, projecting from the bottom of the car platform are the adjustable rollers $r$, to which rollers are secured one end of the car operating wires $r'$, the other ends of which are attached to the operating mechanism to be described. The rollers $r$, have the opposite journal ends $r^2$, one of which is provided with a right angularly disposed locking portion $r^3$, which is adapted to be held into engagement with any one of a series of retaining notches $r^4$, which are formed in any suitable number on one side of one of the bearing lugs R. The length of the rollers $r$, is slightly less than the distance between the bearing lugs, so that the rollers can be moved laterally in order to disengage the locking ends thereof from the notches of the bearing lugs, and thereby allow the rope to be wound up thereon or unwound, according to the extension of the track sections, said rollers being used to take up the slack of the operating wires. After the wires have been wound or unwound on the rollers $r$, sufficiently, the same are moved laterally to bring the locking portions of their journals into engagement with the notches of one of the bearings, and the same are held in this locking engagement by means of the screws or pins S. The screws or pins S, are mounted to work at each end of the car and have their inner ends project into and plug the space between the roller ends and the bearing lugs with the notches, so that the same are held immovable or stationary until another adjustment is necessary. At each end of the flat platform car Q, are pivoted the opposite end boards T. Each of the end boards T, is pivoted at one end to one end of the flat car body, and is provided upon the under side thereof with the angularly disposed loop or eye $t$, which is designed to receive the supporting screw $t'$, the inner end of which engages the threaded block $t^2$, arranged at each end of the flat car on the under side thereof. It is of course understood that one or both of the end boards can be held up from the track by the means just described in order to hold the objects on the car and prevent the same from sliding off, but when carrying articles from the lower end of the pivoted-track to the higher end thereof, the end board at the then lower end of the car is held up from the track so as to form a lower support for the articles on the car, while the opposite end board rests flat on the track. With the end boards thus disposed it will be seen that articles may be conveyed from one side of the apparatus to the other and the car returned to its position automatically. After the car has ascended the track up to its point of pivot or fulcrum, the track can be so adjusted that the loaded car will tilt the high end of the track and thus drop its load automatically. After the car has thus relieved itself of its load the weight at one end of the shaft N, will cause the track to assume its original position and allow the unloaded car to fall back to its starting point.

From the foregoing it is thought that the construction, operation and many advantages of the herein-described apparatus will be readily understood by those skilled in the art and I would have it understood that changes in the form, proportion, and the minor details of construction may be resorted to without departing from the principle or sacrificing any of the advantages of this invention.

It will of course be apparent that in order to move the car in either direction over the track, I employ the double winding drum or windlass U, journaled in the rack bar frame and carried in its adjustments therewith, said winding drum or windlass being operated by means of the crank wheel V, which is arranged adjacent to a suitable platform $v$, which may be at one side of the revoluble frame for convenience in operating the machine if raised too high to reach from the truck.

In order to assist in overcoming the weight of the vertically adjustable frame while raising the same I may employ the opposite swinging weights W, suitably arranged and having connected thereto the weight cords $w$, which are connected at their other ends to the lower end of the vertically adjustable frame thereby greatly facilitating the raising and lowering thereof.

Having thus described my invention, what I claim, and desire to secure by Letters Patent, is—

1. In a portable loading and unloading apparatus, a wheeled platform truck, a vertically adjustable support revolubly mounted on said truck, means for holding said support stationary in any turned position, an extensible track pivotally mounted on said support, and a flat conveyer car adapted to slide over said track back and forth between the ends thereof, substantially as set forth.

2. The combination with a wheeled platform; of a revoluble hollow standard frame bolted to said platform and provided with anti-friction rollers moving thereon and a cog ring, a sliding cog lock plate arranged inside of said ring and adapted to engage the same at any point means for locking said cog plate in and out of engagement with said cog ring, a vertically adjustable frame mounted in the standard frame, an extensible track pivoted to the vertically adjustable frame, and a conveyer car adapted to slide on said track, substantially as set forth.

3. The combination with the wheeled platform, of a revoluble standard frame bolted to the platform and having a lower base plate provided with anti-friction supporting rollers and a cog ring, a sliding cog lock plate mounted on the platform and arranged within the cog ring to engage the same at any point and provided with an upturned tongue at one end, a locking bolt for the cog lock plate adapted to slide in front of said upturned tongue, an adjustable frame mounted within the standard frame, the pivoted track and the conveyer car adapted to move over the track back and forth between its ends, substantially as set forth.

4. In an apparatus of the class described, the combination of a revoluble standard frame having opposite tubular guide standards, means for holding the frame in any set position, opposite connected rack bars mounted in said tubular standards, a hand operated shaft mounted at one side of the standard frame and carrying pinions or cog wheels adapted to mesh with the teeth of the rack bars, a lock for said pinions or cog wheels, the extensible track pivoted to the upper ends of the rack bars, and the conveyer car adapted to move over the track, substantially as set forth.

5. The combination with a wheeled platform; of a revoluble standard frame mounted for adjustment on the wheeled platform and having the opposite tubular guide standards, a vertically adjustable rack bar frame moving in said guide standards, means for adjusting said rack bar frame, a track pivoted at its center to the upper end of said vertically adjustable rack bar frame, counterbalancing devices for the track, and a conveyer car adapted to move over the track, substantially as set forth.

6. The combination with a wheeled platform; of a vertically adjustable revoluble support mounted on the platform, an extensible track pivoted or fulcrumed on said support and provided with toothed adjustment segments, a counter-balanced shaft mounted in said support and carrying pinions or cog wheels meshing with said segments, and the conveyer car on the track, substantially as set forth.

7. The combination of a revoluble standard frame, vertically adjustable supports mounted within said frame, a track pivoted on said supports and provided with toothed segments secured to the under side of the same between the supports, an operating shaft journaled in said supports and carried thereby and provided at one end with a threaded nut or block, pinions or cog wheels mounted on the shaft to mesh with the toothed segments, a counter and overbalancing weight having a threaded stem engaging said nut or block, and the car on the track, substantially as set forth.

8. The combination with a suitable support; of a track pivoted to said support and having toothed segments, an operating shaft journaled on said support and having pinions meshing with said segments and a threaded end, a counter and overbalancing weight provided with a threaded stem engaging the threaded end of the shaft and adapted to counter and overbalance the track, and a conveyer car, adapted to move over the track, substantially as set forth.

9. The combination with a wheeled platform; of a revoluble standard frame mounted on the platform, a vertically adjustable frame mounted in the standard frame, a track pivoted at its center to the upper end of said vertically adjustable frame, counter and overbalancing operating devices for tilting the track, means for holding the track in any tilted position, and the car adapted to move over the track, substantially as set forth.

10. The combination of an adjustable support, the tilting track pivoted on said support, means for adjusting the track, stay hooks arranged at each side of the support, a retaining rope or wire connected at its ends to opposite portions of the track on each side of the pivot or fulcrum and adapted to be looped on either or both of the stay hooks, and the car, substantially as set forth.

11. The combination with a wheeled platform, of an adjustable support mounted on said platform, a fixed track section pivoted at its center on said support, and comprising opposite connected rails having inner face grooves or channels, opposite extension sections arranged to slide over each end of the pivoted section, means for holding the extension sections in any adjusted position, means for tilting the pivoted section, and the car, substantially as set forth.

12. The combination with a wheeled platform, of an adjustable support mounted on said platform, a fixed track section pivoted at its center to said support, and comprising opposite inner rails having inner face grooves or channels, opposite extension sections arranged to slide over each end of the pivoted track section and having duplicate rails, and keepers or sockets under each rail, oppositely working locking bolts arranged at each end of the pivoted track section and adapted to engage the keepers of the extension sections, means for tilting the pivoted track section, and the car having opposite guide rollers or wheels working in the face grooves or channels of the rails and opposite retaining flanges overlapping the sides of the rails, substantially as set forth.

13. The combination with a track, the rails of which have inner face grooves or channels, of a flat car mounted to run over the track and provided with under guide rollers or wheels working in said face grooves or channels, and opposite retaining flanges overlapping the sides of the rails, threaded blocks arranged at each end of the car and on the under side thereof, end boards hinged or pivoted to the ends of the car body and provided on their under sides with angularly disposed loops or eyes, and supporting screws adapted to work through said loops or eyes and engage said threaded blocks to support the end boards above the track, substantially as set forth.

14. The combination with a suitable support; of a double drum or windlass journaled within the support, a track pivoted on the support and having guide pulleys or rollers at both ends, a flat car arranged to move over the track, adjustable rollers journaled under the car, means for holding the rollers stationary, and the car operating wires connected at one end to a roller, passing over the end guide pulleys or rollers of the track and connected at their other ends to the double windlass or drum, substantially as set forth.

15. The combination with an adjustable support, of a double drum or windlass journaled within the support, a tilting track pivoted on the support and having guide pulleys or rollers at both ends, a flat car arranged to move over the track, bearing lugs projecting from the bottom of the car one of said lugs in each pair being provided with a series of retaining notches at one side, winding and unwinding rollers journaled in said bearing lugs and having a lateral play therebetween, one of the journaled ends of each roller being provided with a right-angularly disposed locking portion which is adapted to engage and disengage said notches, locking screws or pins mounted at each end of the car body and adapted to plug the space between the roller ends and the bearing lugs with the notches to hold the rollers stationary, and the operating wires wound at one end on said rollers under the car, passing over the guide wheels at the ends of the track and wound at their outer ends on separate portions of the double windlass or drum, substantially as set forth.

In testimony that I claim the foregoing as my own I have hereto affixed my signature in the presence of two witnesses.

EMILIO CARDARELLI.

Witnesses:
   J. H. SIGGERS,
   H. G. PIERSON.